United States Patent
Imai et al.

[11] Patent Number: 6,104,504
[45] Date of Patent: Aug. 15, 2000

[54] FACSIMILE APPARATUS USING A SELECTIVE POLLING SIGNAL

[75] Inventors: Satoshi Imai; Shinichiro Kohri; Makoto Kobayashi; Koichiro Ohtsuka, all of Kawasaki, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/874,808

[22] Filed: Jun. 13, 1997

Related U.S. Application Data

[63] Continuation of application No. 08/397,361, Mar. 2, 1995, abandoned.

[30] Foreign Application Priority Data

| Mar. 4, 1994 | [JP] | Japan | 6-059948 |
| Apr. 8, 1994 | [JP] | Japan | 6-095584 |
| Apr. 14, 1994 | [JP] | Japan | 6-100657 |
| Apr. 14, 1994 | [JP] | Japan | 6-100755 |
| Sep. 9, 1994 | [JP] | Japan | 6-241958 |

[51] Int. Cl.⁷ ..................................................... H04N 1/00
[52] U.S. Cl. ........................................... 358/407; 358/400
[58] Field of Search .......................... 358/400, 402–403, 358/407, 468, 434–436, 438–440

[56] References Cited

U.S. PATENT DOCUMENTS

| 4,994,926 | 2/1991 | Gordon et al. | 358/407 |
| 5,216,705 | 6/1993 | Yoshida et al. | 379/100 |
| 5,274,467 | 12/1993 | Takehiro et al. | 358/402 |
| 5,367,564 | 11/1994 | Sutoh et al. | 358/407 |
| 5,452,099 | 9/1995 | Von Meister | 358/407 |

*Primary Examiner*—Thomas D. Lee
*Assistant Examiner*—Stephen Brinich
*Attorney, Agent, or Firm*—Fitzpatrick, Cella, Harper & Scinto

[57] ABSTRACT

A facsimile apparatus using a selective polling signal includes a holding unit for holding a polling image, a receiving unit for receiving the selective polling signal, an extraction unit for extracting a process command for the image held in the holding unit from the selective polling signal received by the receiving unit, and an execution unit for executing the process command extracted by the extraction unit.

31 Claims, 14 Drawing Sheets

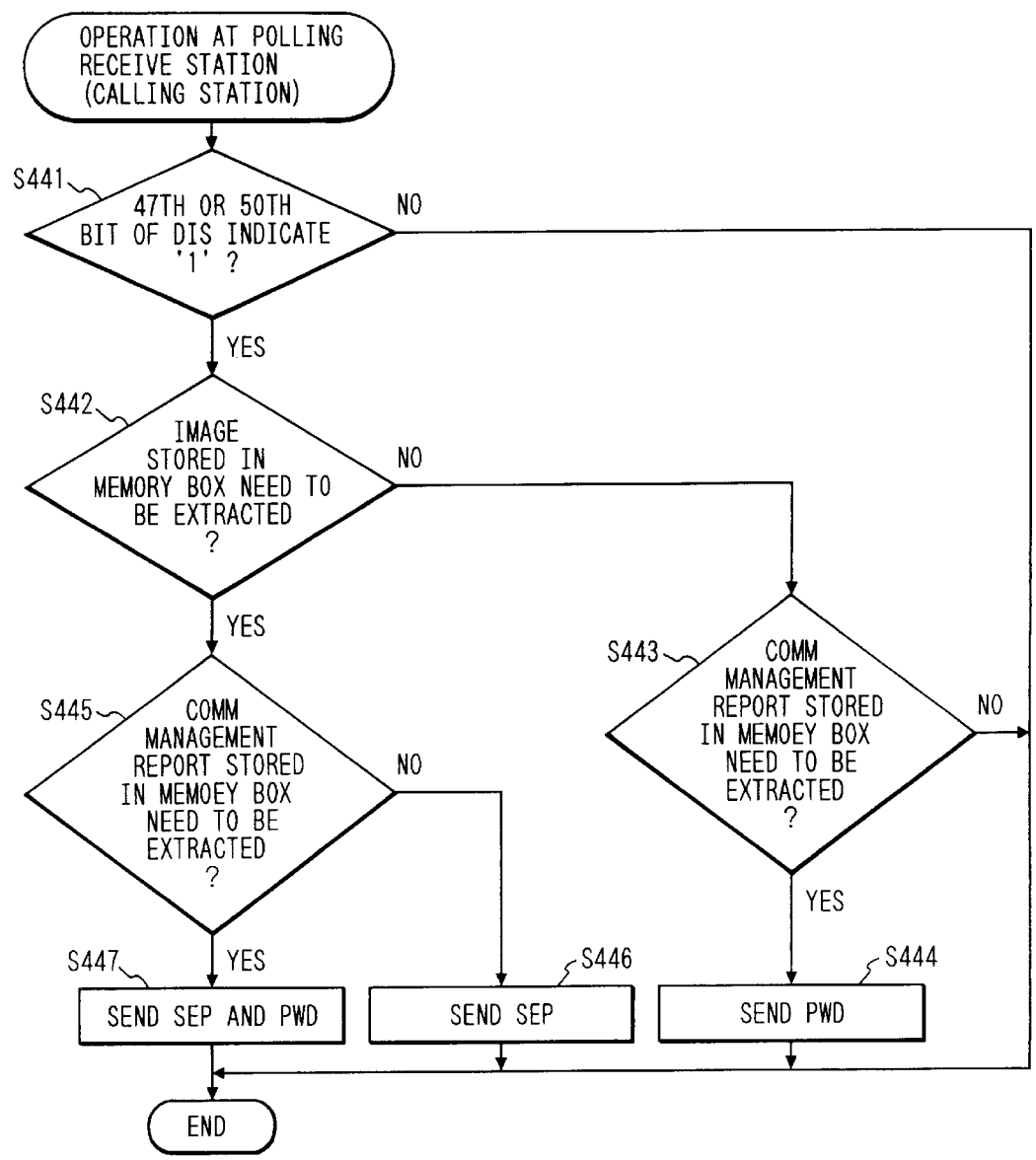

6,104,504

FACSIMILE APPARATUS USING A SELECTIVE POLLING SIGNAL

This application is a continuation of application Ser. No. 08/397,361 filed Mar. 2, 1995, now abandoned.

BACKGROUND OF THE INVENTION

1. Field of the Invention

The present invention relates to a facsimile apparatus which carries out communication by using a selective polling signal (SEP), a pass word signal (PWD) and a sub-address signal (SUB) which are additional functions of the ITU-T (former CCITT) T.30 Additional Recommendation.

2. Related Background Art

In a prior art facsimile apparatus, storing of a polling image and a request for polling are conducted using the particular codes of a manufacturer.

Recently, a selective polling signal has been decided as a function of the T.30 Additional Recommendation by the CCITT. This signal is intended to be used as a sub-address for a polling mode. Particularly, it is used as a document identification describer (number) which is queued for polling in a called station.

However, a communication architecture which uses a selective polling signal has not yet been established.

Further, since the above-mentioned SEP, PWD and SUB signals permit the designation of a 20-digit number, it is anticipated that the operation by an operator will be complicated.

SUMMARY OF THE INVENTION

It is an object of the present invention to improve a facsimile apparatus.

It is another object of the present invention to propose various methods for using the SEP, PWD and SUB signals.

It is still another object of the present invention to provide a facsimile apparatus which can simplify an operation for communication using the SEP, PWD and SUB signals.

In accordance with the present invention, a facsimile apparatus can use a selective polling signal established for use as a document identification number in a standard communication recommendation to provide a process command other than a document identification number. In accordance with other aspects of the present invention, an apparatus can automatically generate a selective polling number assigned to an image held in memory while the image is being held in memory, and can automatically include an apparatus identification number within the selective polling number. In accordance with yet another aspect of the present invention, the apparatus can transmit both a document sheet image and a communication management report when both of a selective polling signal and a password signal are received.

BRIEF DESCRIPTION OF THE DRAWINGS

FIG. 15 shows a flow chart of an operation in a polling receiving station (called station) in the Embodiment 5.

DETAILED DESCRIPTION OF THE PREFERRED EMBODIMENTS

[Embodiment 1]

Embodiment 1 of the present invention is explained below.

Figure 1:
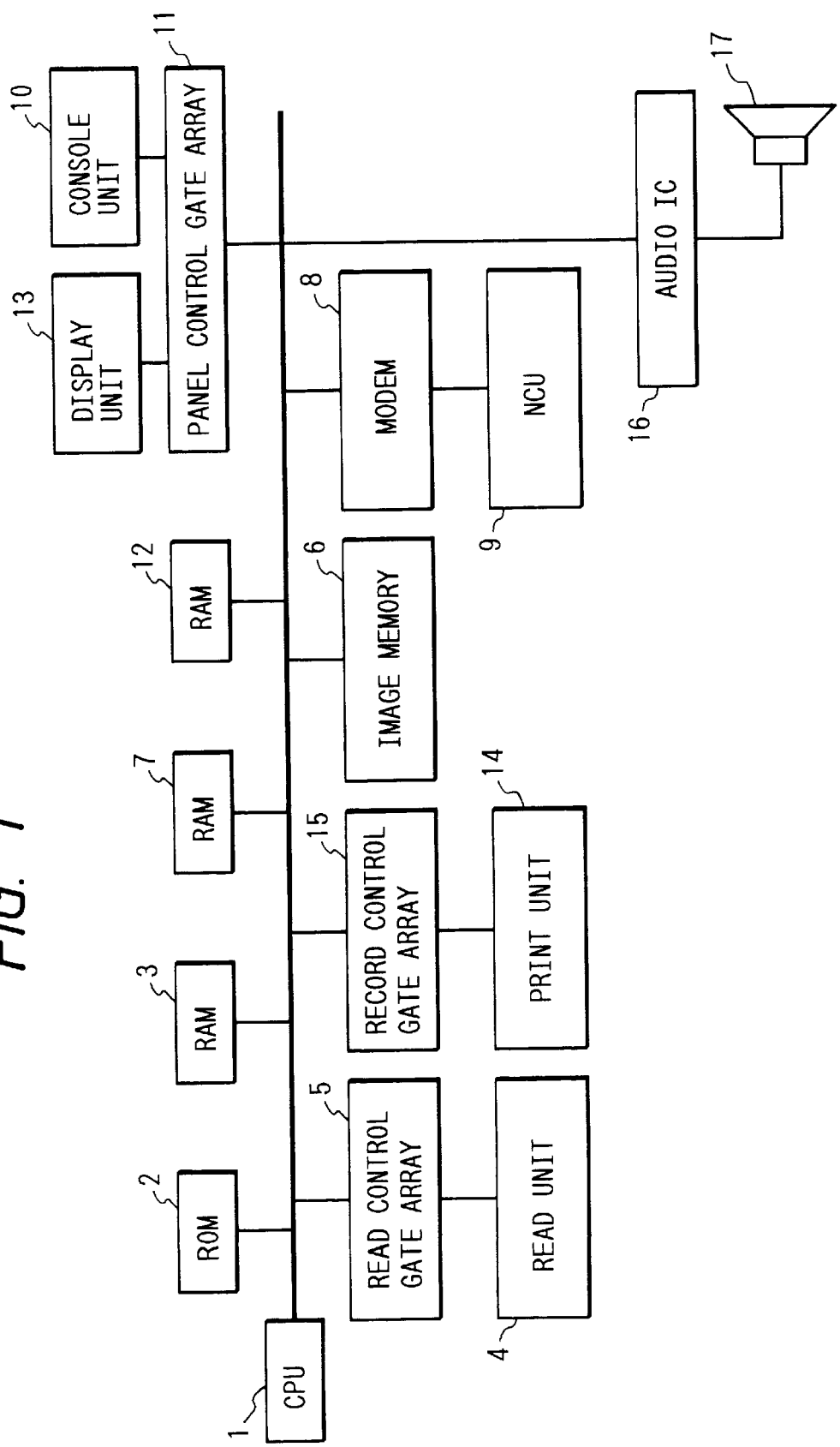
FIG. 1 shows a block diagram of a facsimile apparatus of an Embodiment 1.

FIG. 1 shows a block diagram of a configuration of a facsimile apparatus in accordance with Embodiment 1.

A CPU 1 is a central processing unit which controls the entire facsimile apparatus in accordance with the content of a program stored in a ROM 2. A RAM 3 is used as a working area as required.

A read unit 4 comprises a contact sensor and reads an image in a facsimile transmission mode. The read unit 4 is connected to a read control gate array 5 which controls the read operation. The read gate array 5 compression-decodes an image read by the read unit 4 and stores it in an image memory 6.

The image memory 6 comprises a DRAM which can store a plurality of image data. Image management information of the images stored in the image memory 6 such as an accept number, address information, the number of pages, stored image information and an operation command are stored in a RAM 7.

In an image information transmission mode, a modem 8 PM-AM modulates the image information stored in the image memory 6. In an image information reception mode, it demodulates and expansion-decodes the image information, checks for an image error, compression-encodes the image information and stores it in the image memory 6.

An NCU 9 is connected to the modem 8, transmits the image information compression-encoded by the modem 8 to an external line (not shown) and receives an externally transmitted signal.

A console unit 10 is used by an operator to command various instructions and set various functions and comprises a plurality of keys (not shown). The commanding of instructions and the setting of functions are conducted by depressing corresponding function keys (not shown). The content of an operation conducted by the console unit 10 is stored and held in a RAM 12 through a panel control gate array 11 and detected by the CPU 1. The CPU 1 controls the apparatus in accordance with the data inputted from the console unit 10 and displays the content of an operation and necessary data stored in the RAM 12 on a display unit 13 comprising a liquid crystal panel.

A print unit 14 is connected to a record control gate array 15 which controls the operation of the print unit 14. The image stored in the image unit 6 is expansion-decoded by the record control gate array 15 and it is printed on a record sheet by the print unit 14. The printed print sheet is ejected from an ejection station (not shown). The print unit 14 may be a laser beam printer.

The CPU 1 controls an audio (or speech) IC 16 in accordance with the information stored in the RAM 3, the RAM 7 and the RAM 12 to output sound from a speaker 17.

Figure 2:
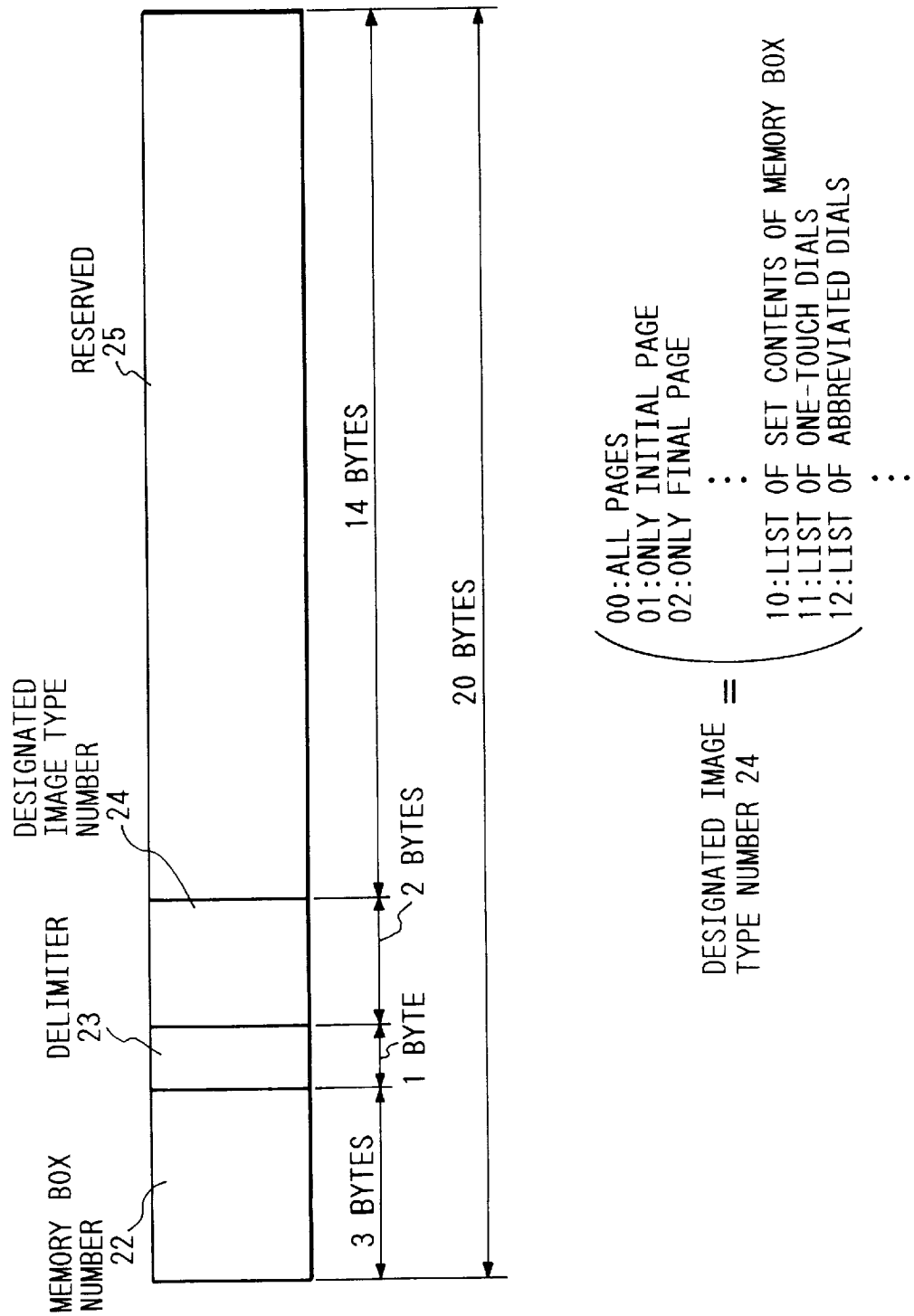
FIG. 2 shows an example of a format of a selective polling signal.

FIG. 2 shows an example of a format of a selective polling signal used in transmitting and receiving a polling signal in the facsimile apparatus of the above configuration.

A selective polling signal (hereinafter referred to as SEP) 21 is one which is set by the CCITT T.30 Additional Recommendation as an optional signal for polling and comprises a 20-digit (20-bytes) numeral. The SEP is sent out together with a mode designation signal (DTC) only when '1' is set in the bit 47 of a function signal (DIS) transmitted from a transmission station.

As shown in FIG. 2, a memory box number 22 which is an ID of a memory box is stored as a three-digit numeral in bytes 1–3 of the SEP 21. The memory box comprises a memory block management record which is management information to manage the memory block forming the image memory 6 and an image management record for managing the image information stored in the memory block.

A byte 4 stores a one-byte delimiter 23 as a punctuation to define an internal configuration of the SEP 21.

Bytes 5 and 6 store two-digit numerals (100 kinds from 00 to 99) as a designated image type number 24. The designated image type number 24 designates a type of image which the operator desires to polling receive such as all pages of the stored image, a first page or a last page of the stored image, and the content of setting of the memory box or registration information such as a one-touch dial list or an abbreviation dial list.

A byte 7 and subsequent bytes are spare areas and may store other information than those described above.

In this configuration, when the image designation is to be read using the SEP, the facsimile apparatus in the polling receiving station (hereinafter referred to as a calling station) first receives a DIS from the facsimile apparatus in the polling transmission station (hereinafter referred to as a called station), and transmits a DTC to designate the polling mode.

If the bit 47 of the DIS which the calling station received is set to '1', it means that the called station has a selective polling function and the calling station transmits the SEP together with the DTC.

On the other hand, when the called station recognizes the SEP transmitted by the calling station, it reads the image designated to the SEP from the image memory 6 in a form shown in FIG. 2 and transmits it. When the calling station receives the designated image, the image designation and read operation is terminated.

Figure 3:
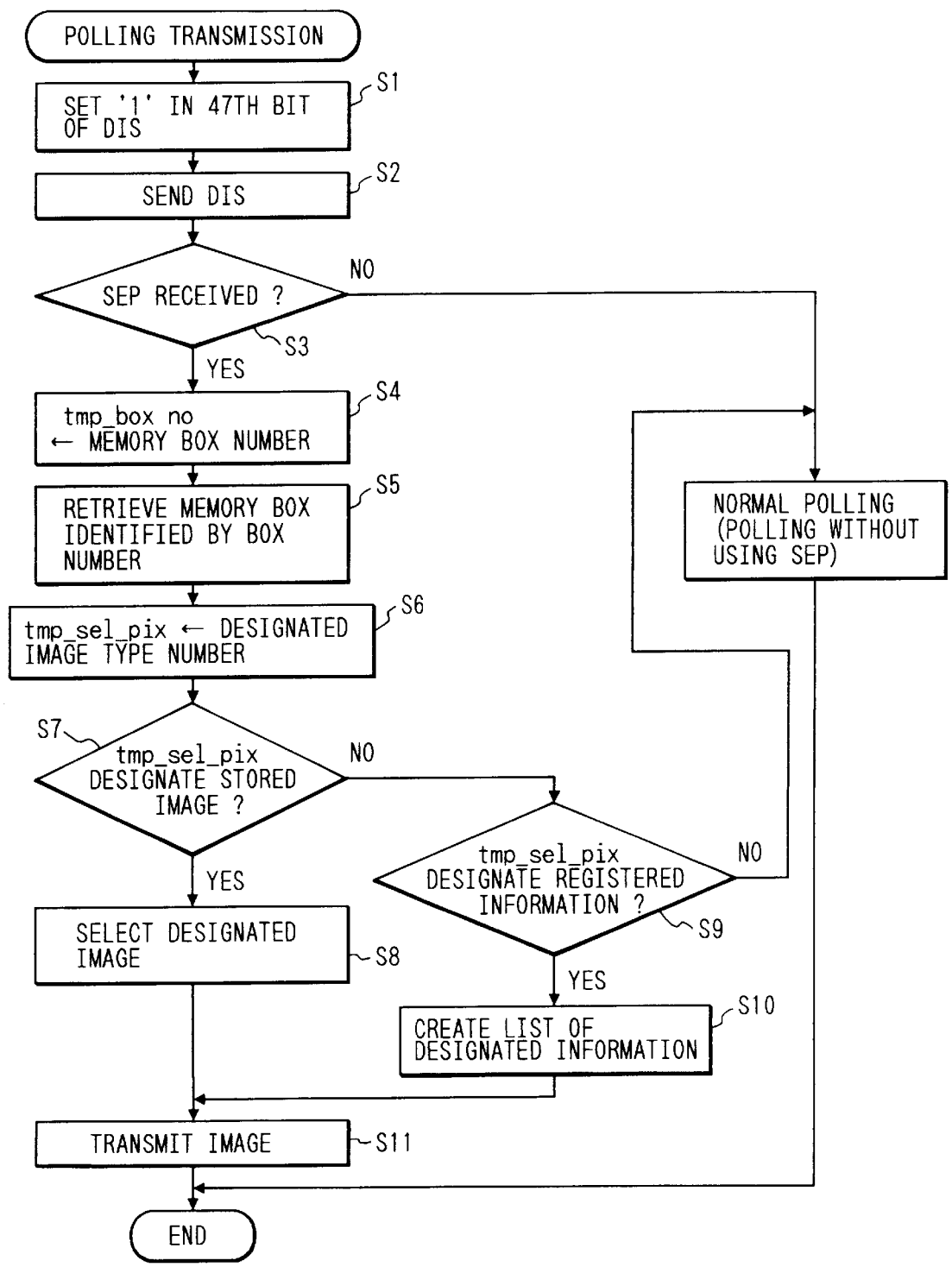
FIG. 3 shows a flow chart of an image designation and read operation carried out in a facsimile apparatus in a called station.
Figure 4:
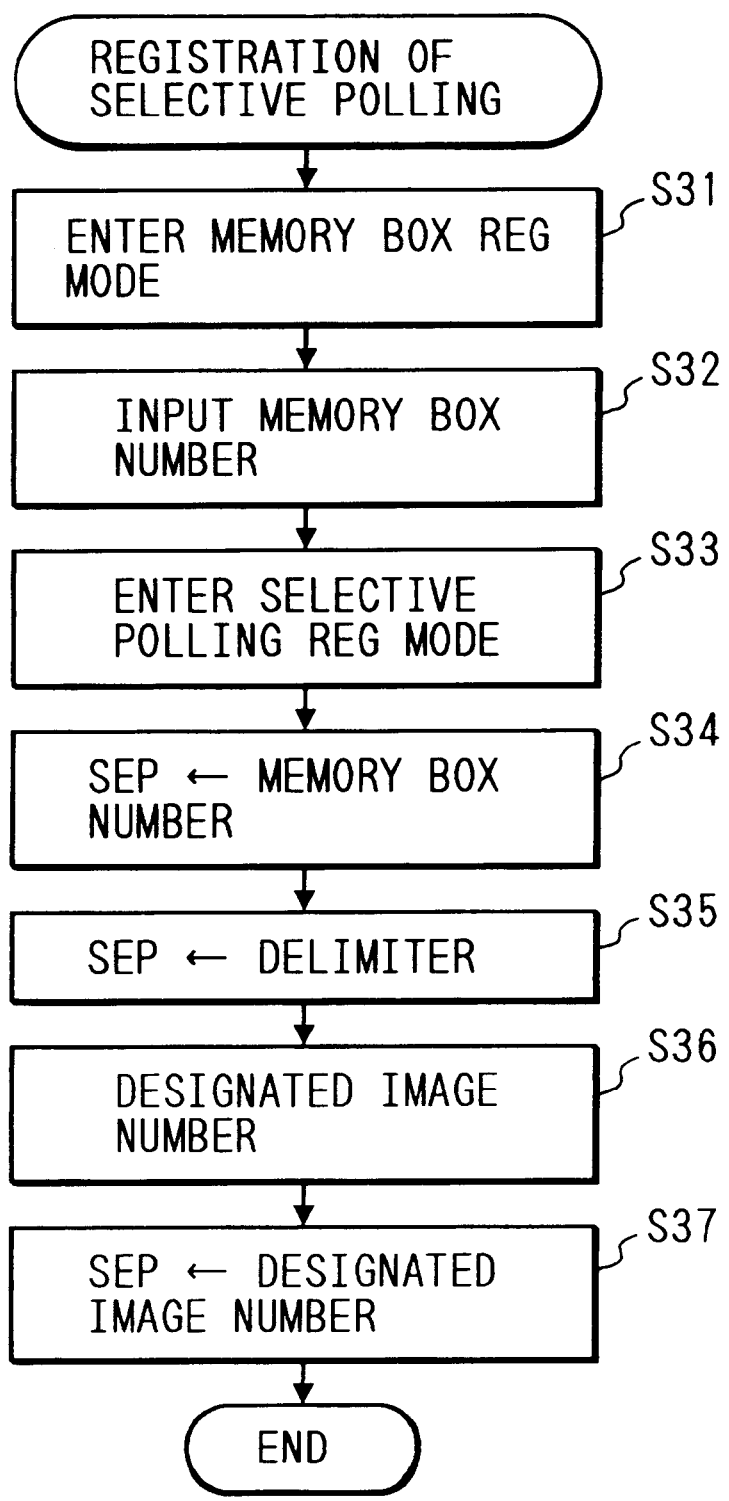
FIG. 4 shows a flow chart of a registration operation of the selective polling signal carried out in a facsimile apparatus in a calling station.
Figure 5:
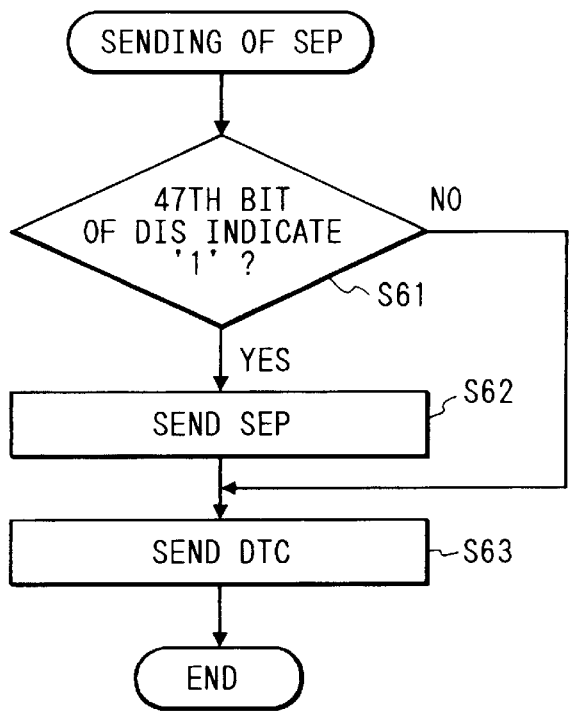
FIG. 5 shows a flow chart of a selective polling signal transmission operation carried out in the facsimile apparatus in the calling station.

The image designation and read operation using the selective polling is carried out in accordance with the flow charts shown in FIGS. 3 to 5.

A program for the operation to be carried out in accordance with the flow charts of FIGS. 3 to 5 is stored in the ROM 2 and it is executed by the CPU 1. Variables used in the procedure are stored in the RAM 3.

First, referring to the flow chart of FIG. 3, the image designation and read operation (selective polling transmission) in the called station is explained.

In order to declare to the calling station that the selective polling is effective if called by the calling station while waiting for the polling of the called station, the bit 47 of the DIS is set to '1' and it is transmitted (step S1, step S2). Then, the SEP which is transmitted from the calling station together with the DTC is monitored (step S3), and if the SEP is not detected, a normal polling procedure is executed.

In the step S3, if the SEP transmitted together with the DTC is detected, the memory box number 22 stored in the bytes 1–3 of the SEP 21 is read and it is stored in a variable tmp-box-no (step S4), and a memory box having the corresponding box-no to the memory box number tmp-box-no is searched (step S5). The CPU 1 reads the designated image type number 24 in the SEP and stores it in a temporary variable tmp-sel-pix (step S6).

Based on the management record and the image management record stored in the memory box retrieved in the step S5, whether the image type represented by the designated image type number tmp-sel-pix stored in the step S6 is the stored image described above or not is determined (step S7). When it is determined that the image type represented by the designated image type number tmp-sel-pix is the stored image, the stored image is read from the memory block in the image memory 6 based on the image management record and the management record in the designated memory box (step S8), it is PM-AM modulated by the modem 8, and it is transmitted through the NCU 9 (step S11). Then, the process is terminated.

On the other hand, if it is determined in the step S7 that the image type represented by the designated image type number tmp-sel-pix is not the stored image of the image memory 6, whether the image type represented by the designated image type number tmp-sel-pix is the registration information described above or not is determined (step S9). If it is determined that the image type represented by the designated image type number tmp-sel-pix is not the registration information, the process is terminated and a normal polling procedure is executed.

If it is determined in the step S9 that the image type signal represented by the designated image type number tmp-sel-pix is the registration information, a registration information list is prepared based on the management information stored in the management record of the designated memory box (step S10) and it is PM-AM modulated by the modem 8 and transmitted through the NCU 9 (step S11). Then, the process is terminated.

Referring to FIGS. 4 and 5, a designated image read operation (selective polling reception) carried out in the calling station is explained.

FIG. 4 shows a flow chart of a process to register a command for designating an image to be read to the SEP to be transmitted.

When a command to carry out the selective polling by the operator is entered from the console unit 10, the facsimile apparatus assumes a registration mode of the memory box (step S31). When a desired memory box number is designated by the operator (step S32), a registration mode of the SEP is started (step S33). The CPU 1 writes the memory box number inputted in the step S32 to the designated memory box number 22 in the bytes 1–3 of the SEP as shown in FIG. 2 (step S34), and writes the delimiter 23 in the byte 4 (step S35).

When the designated image number representing an image desired for polling reception is inputted by the operator (step S36), the CPU 1 writes the inputted designated image number 24 in the bytes 5–6 of the SEP 21 (step S37) and the process is terminated.

FIG. 5 shows a flow chart of a process to transmit the SEP from the calling station to the called station.

Whether the bit 47 of the DIS transmitted from the called station is '1' or not is determined (step S61), and if it is not '1', the DTC is transmitted in the normal procedure (step S63). If the bit 47 is '1', the SEP registered in the process of FIG. 4 is transmitted together with the DTC (steps S62, S63) and the communication is subsequently carried out in the normal procedure to receive necessary image.

[Embodiment 2]

Figure 6:
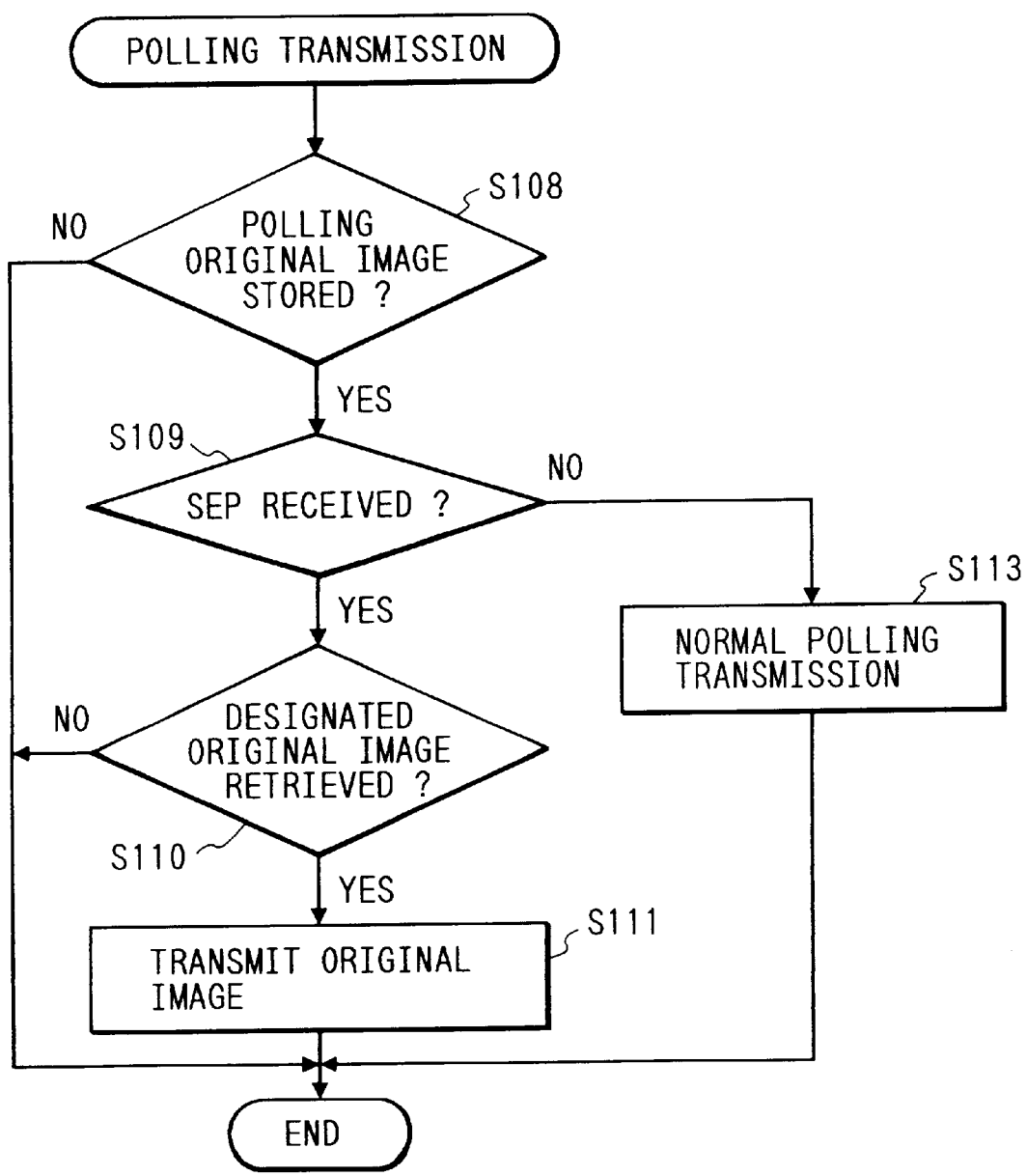
FIG. 6 shows a flow chart of an operation of polling transmission of a called transmitting terminal in an Embodiment 2.

FIG. 6 shows a flow chart of an operation of polling call-receive transmission the called transmitting terminal in the Embodiment 2.

The polling call-receive transmission is started by a polling request of the calling receiving terminal. The presence or absence of a document sheet in a polling queue (or a document or original image stored for polling waiting) is determined (step S108), and if there is no such document sheet, the process is terminated.

If there is a document sheet in the step S108, the presence or absence of the SEP signal reception which is the T.30 frame of the ITU Recommendation is determined (step S109) and if it is not the SEP reception signal, a normal polling procedure is carried out (step S113) and the process is terminated.

If it is the SEP reception signal, the received SEP signal is analyzed, the document sheet number set in the calling receiving station is read, the document sheet designated by the document sheet number is collated with the document sheet number of the document sheet in the queue (step S110) and if there is a matching document sheet, the document sheet is transmitted (step S111), and if there is no matching document sheet, the absence of a document sheet is announced to the calling receiving station and the process is terminated.

Figure 7:
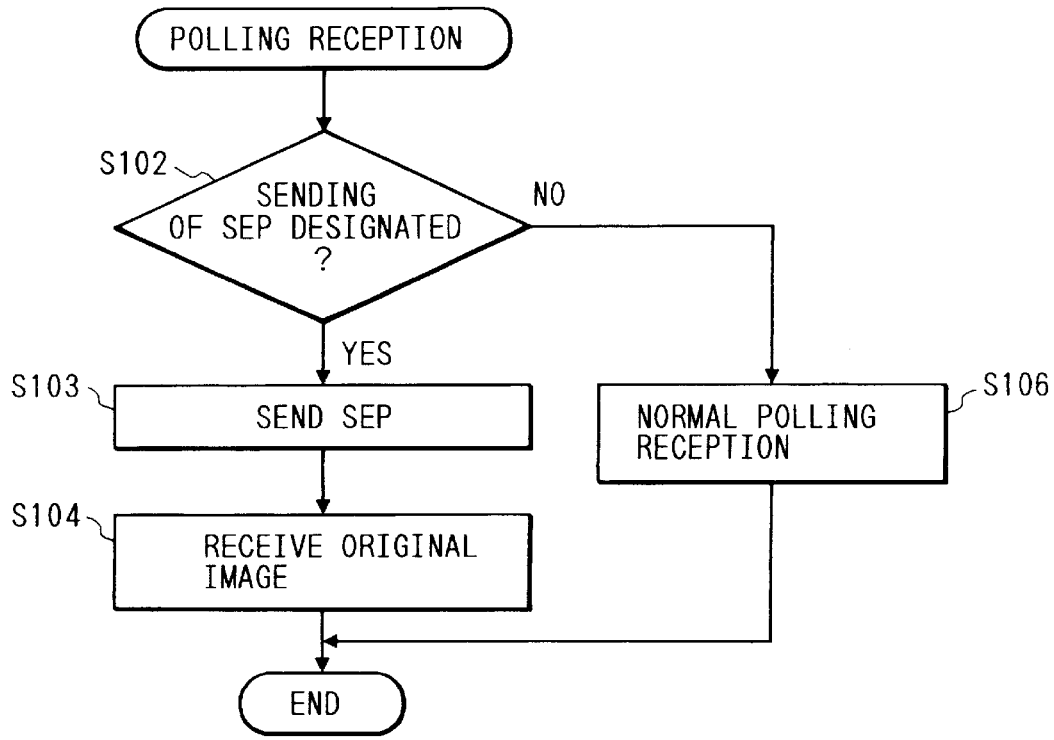
FIG. 7 shows a flow chart of an operation of polling reception of a calling receiving terminal in the Embodiment 2.

FIG. 7 shows a flow chart of an operation of polling call-send reception in the calling receiving terminal in the present embodiment.

The polling call-send reception function is started by the operator. Whether the SEP transmission is designated or not is determined (step S102), and if it is the SEP transmission, the SEP transmission is carried out (step S103). If it is not the SEP transmission, a normal polling procedure is carried out (step S106) and the process is terminated.

After the SEP transmission (step S103), the document sheet is received (step S104) and the process is terminated.

In this manner, the polling reception designation only a desired document sheet is achieved between terminals of different type by using the SEP (selective polling) signal of the ITU Recommendation T.30 which comprises 20-digit numerals of the SEP signal.

In accordance with the present invention, the polling waiting document sheets to a plurality of destinations may be stored in the called transmitting terminal. Thus, the occupation of the polling transmission function by the waiting document sheet to only one destination is avoided. On the other hand, in the calling receiving terminal, a desired document sheet may be received at any time.

[Embodiment 3]

In the Embodiment 3, when the polling document sheet numbers are assigned to respective ones of the plurality of stored different polling document sheets as they are in the Embodiment 2, the polling document sheet numbers are automatically generated and assigned when the polling document sheets are stored in the memory to save a time of the operator to input the 20-digit polling document sheet numbers each time.

Figure 8:
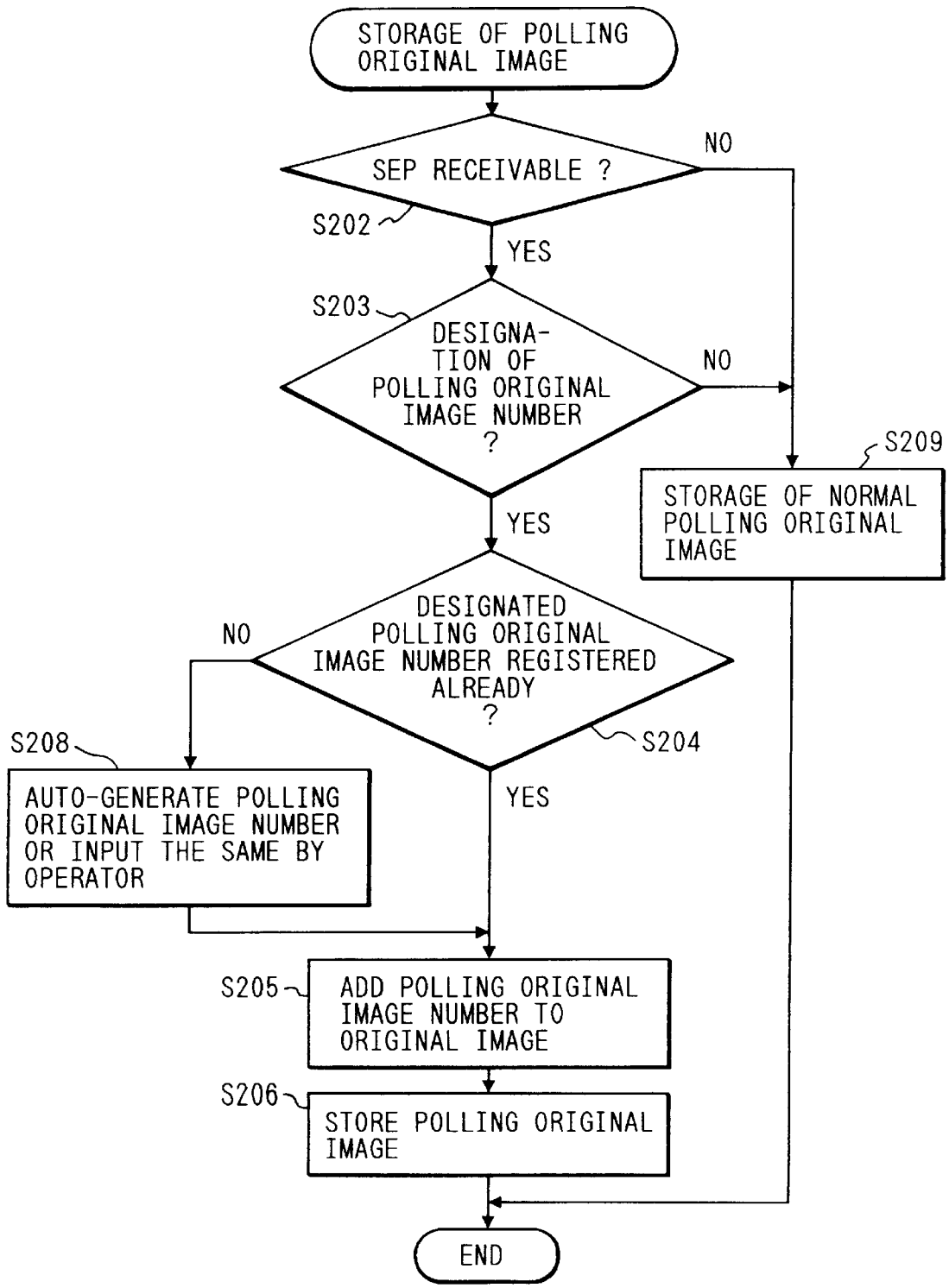
FIG. 8 shows a flow chart of an operation in storing a polling document sheet of the called transmitting terminal in an Embodiment 3.

FIG. 8 shows a flow chart of an operation in storing the polling document sheets of the called transmitting terminal in the Embodiment 3.

The operation is started by a polling waiting document sheet store request by the operator. First, whether the SEP signal reception is ready or not is determined (step S202), and if it is ready, whether the polling document sheet number is to be designated or not is determined (step S203). The designation is made by an input by the operator. It may be preset by a one-touch dial function.

If the SEP signal reception is not ready in the step S202, or if the polling document sheet number is not designated in the step S203, a normal polling document store process (polling without the SEP signal) is carried out (step S209) and the process is terminated.

The image processed by the normal polling document sheet store process is transmitted when the DTC signal is received without receiving the SEP signal. The image may be transmitted in response to the reception of the DTC signal without regard to the reception of the SEP signal.

When the polling document sheet number is designated in the step S203, whether the polling document sheet number has been registered or not is determined in a step S204, and if it is not registered, the polling document sheet number is automatically generated or generated by the entry by the operator in a step S208.

The registration is defined as follows.

In the Embodiment 3, the station (transmitting station) which stores the polling document sheet and waits the polling generates and stores the polling document sheet number which is different for each destination station. The polling document sheet number is generated when a document sheet for a destination station is first stored and it is registered. In the next storing of a polling document sheet for the same destination, the polling document sheet number is not separately generated but the registered polling document sheet number is read for use.

On the other hand, an operator in the station (receiving station) requesting the transmission of the polling document sheet is informed from the operator of the transmitting station of the polling document sheet number assigned to its own apparatus by the transmitting station, and when he/she requests the polling of the document sheet addressed to his/her own station by using the SEP signal, it reads the polling document sheet number informed by the operator of the transmitting station and transmits it as the SEP signal. The polling document sheet number, once used, is registered in association with the telephone number of the destination station so that in the next transmission, the registered polling document sheet number is read and it is transmitted as the SEP signal.

By registering in this manner, the operator in the Embodiment 3 need not enter the 20-digit polling document sheet number each time.

In the step S208, the polling document sheet number is automatically generated uniquely to the designated destination.

Specifically, the polling document sheet number is generated by a random number and the polling document sheet number by the random number is generated for only the digits of the 20 digits designated by the operator. In this method, however, since the polling document sheet number may overlap with other address, it is checked at the generation and if it overlaps, it is regenerated.

The polling document sheet number generated in this manner is stored in the RAM so that it may be readily read out. This is the registered polling document sheet number. In storing the polling document sheet, the registered number is read from the RAM and it is delivered to a step S205 to be described later.

If the polling document sheet number is registered in the step S204, or if the polling document sheet number is generated in the step S208, the process proceeds to the step S205 to assign the polling document sheet number to the stored document sheet, and in a step S206, the polling document sheet is stored, then, the process is terminated.

Figure 9:
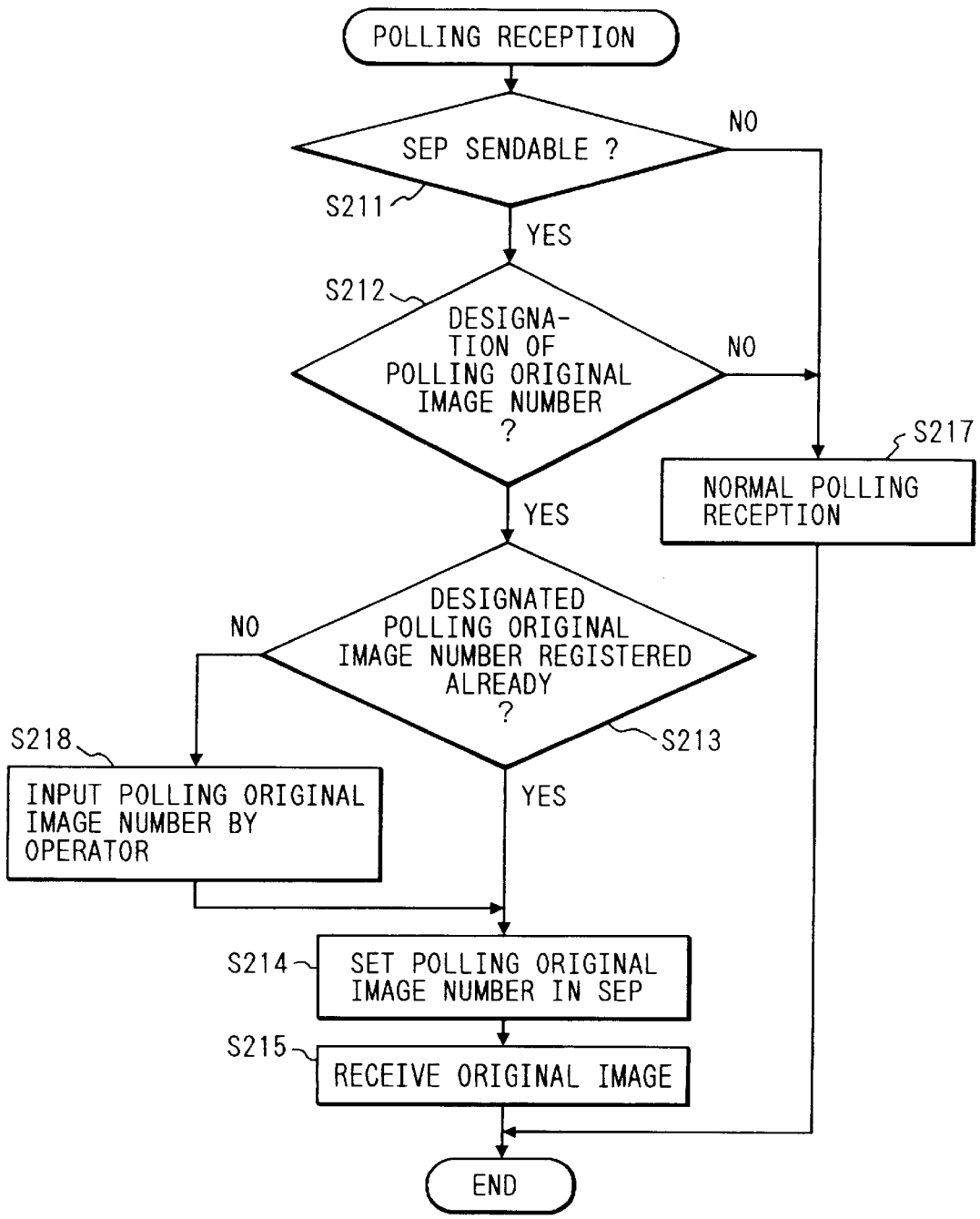
FIG. 9 shows a flow chart of an operation of polling reception of the calling receiving terminal in the Embodiment 3.

FIG. 9 shows a flow chart of an operation of polling call-send reception of the calling receiving terminal in the Embodiment 3.

First, the polling call-send reception function is started by the operator. Whether the SEP signal transmission is ready or not is determined (step S211), and if it is ready, whether the polling document sheet number is designated or not is determined (step S212). The designation is carried out by the entry by the operator. It may be preset in the one-touch dial.

If the SEP signal transmission is not ready in the step S211, or if the polling document sheet number is not designated in the step S212, a normal polling reception procedure (polling without the SEP signal) is carried out (step S217) and the process is terminated.

When the polling document sheet number is designated in the step S212, whether the polling document sheet registration is present or not is determined in a step S213, and if the registration is not present, the process proceeds to a step S218 to set the polling document sheet number. Namely, the polling document sheet number is preset. More particularly, the polling document sheet number generated and set in the called transmitting station is noticed to the calling receiving station through communication between the operators. The informed polling document sheet number is registered.

If the polling document sheet number registration is present in the step S213, or after the polling document sheet registration number is generated by the operator in the step S218, the polling document sheet number is set in the SEP signal. The document sheet is received (step S215) and the process is terminated.

In the Embodiment 3, when the polling document sheet number is generated, it is generated for the digits designated by the operator. Alternatively, the document sheet number may use all of the 20 digits with a structure not readily referred so that a closed area communication capability is significantly improved.

In accordance with the Embodiment 3, it is not necessary for the operator to set the polling document sheet number for each document waiting for polling and the troublesome registration process by the operator is reduced by the regularly automatic generation of the polling document sheet number.

[Embodiment 4]

In the Embodiment 3, the number to be assigned to the polling document sheet is automatically generated and assigned in the transmitting station but in the receiving station of the Embodiment 3, it is necessary for the operator to register it. In the Embodiment 4, the polling document sheet number is automatically generated and registered in both the transmitting station and the receiving station.

Figure 10:
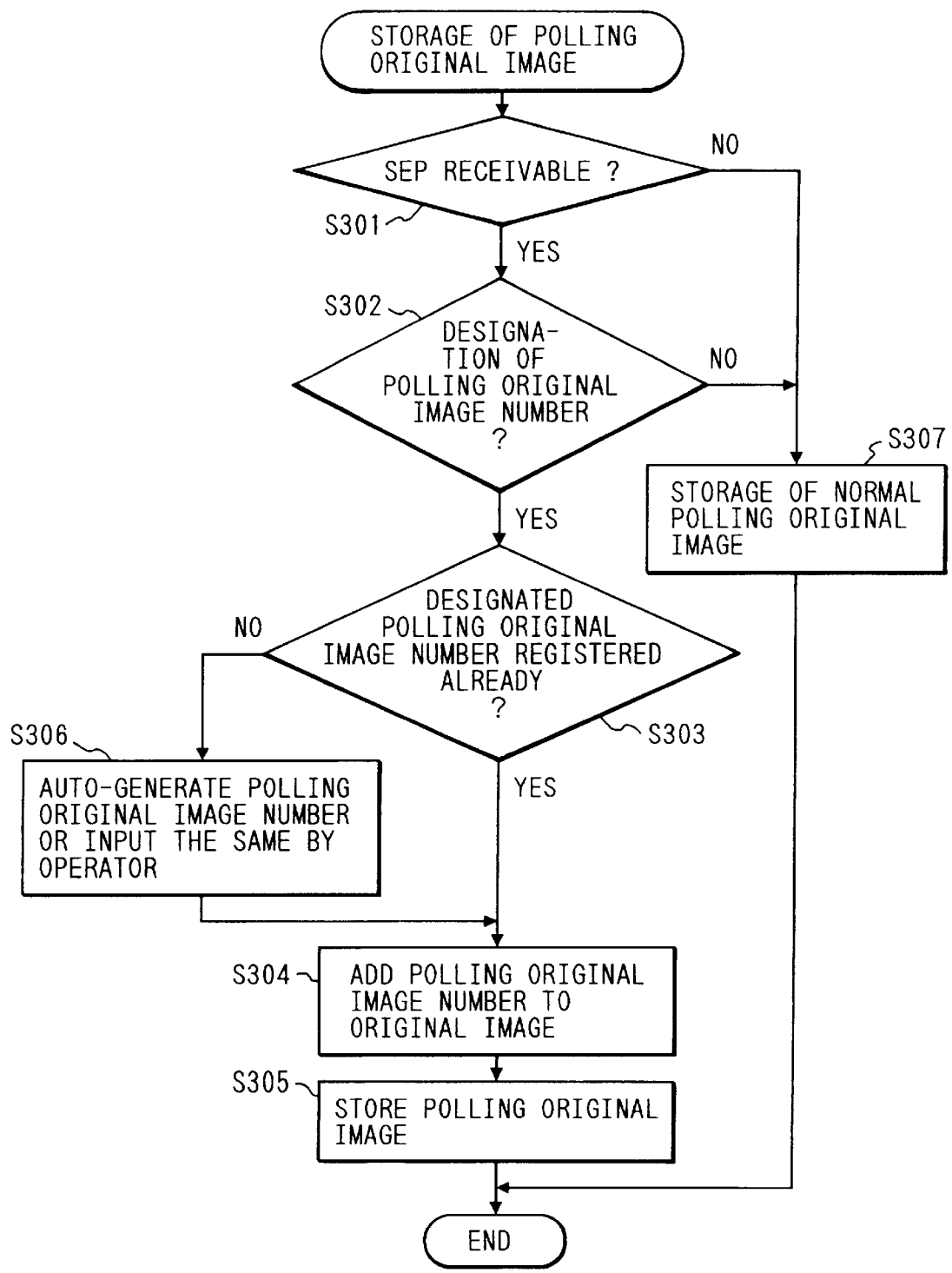
FIG. 10 shows a flow chart of an operation in storing a document sheet to be polling sent in an Embodiment 4.

An operation in storing the document sheet which is the subject of the polling transmission in the facsimile apparatus of the Embodiment 4 is explained with reference to the drawing. FIG. 10 shows a flow chart of an operation in storing the document sheet which is the subject of the polling transmission in the facsimile apparatus of FIG. 1.

When the operator depresses a key of the console unit 10 to issue a polling waiting document sheet storing request, a step S301 is carried out as shown in FIG. 10. In the step S301, whether the SEP signal reception is ready or not is determined. If the SEP signal reception is ready, a step S302 is carried out, and if the SEP signal reception is not ready, a step S307 is carried out.

In the step S307, a normal polling document sheet storing process (polling without SEP signal) is carried out and the process is terminated.

In the step S302, whether the polling document sheet number is to be designated for each of a plurality of document sheets having different addresses or not is determined. The designation is carried out by the entry by the operator. It may be preset in the one-touch dial. When the polling document sheet number is to be designated, a step S303 is carried out, and when the polling document sheet number is not to be designated, the step S307 is carried out.

In the step S303, whether a predetermined number within 20 digits has been registered as the polling document sheet number or not is determined. If the polling document sheet number is registered, a step S304 is carried out, and if the polling document sheet number is not registered, a step S306 is carried out. This registration process is same as that of the Embodiment 3.

In the step S306, the polling document sheet number is generated. The generation of the polling document sheet number may be made by the automatic generation or the manual generation by the operator. In the present embodiment, when the polling document sheet number is automatically generated, the telephone number of the destination station which receives the polling document sheet is included in the polling document sheet number. In the present method for generating the polling document sheet number, a security problem may arise if the telephone number of the destination station is simply included. Thus, in order to solve the security problem, a password predesignated by the operator is included in the polling document sheet number. The generated polling document sheet number is stored in the RAM 7. The polling document sheet number is automatically generated based on the telephone number of the destination station and the password, and by presetting the telephone number of the destination station and the password, the operator may more readily assign the polling document sheet number.

In the step S304, a polling document sheet number is read out from the RAM 7 and it is assigned to each stored document sheet.

Then, a step S305 is carried out. In the step S305, the polling document sheet is stored and the process is terminated.

A transmission operation after the storing of the document sheet is now explained.

When the polling transmission request signal is received from the sending station, the polling document sheet number is extracted from the received SEP signal.

The extracted polling document sheet number is collated with the polling document sheet number assigned to each document sheet so that the document sheet having the matching polling document sheet number to the extracted polling document sheet number assigned thereto is extracted.

The extracted document sheet is transmitted to the destination station.

Figure 11:
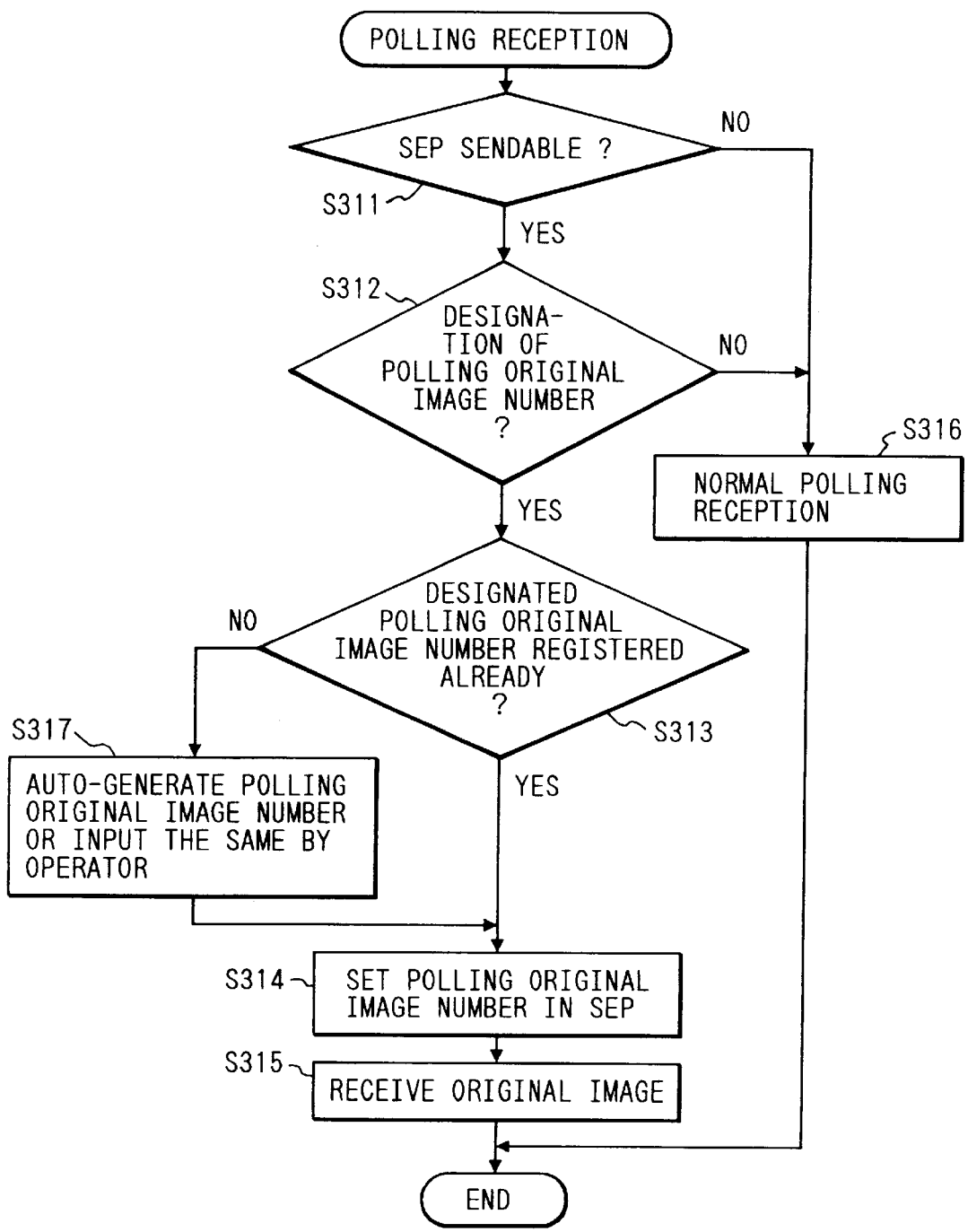
FIG. 11 shows a flow chart of an operation of polling reception in the Embodiment 4.

An operation of polling call-send reception in the facsimile apparatus in the present embodiment is now explained with reference to the drawing. FIG. 11 shows a flow chart of an operation of polling call-send reception in the facsimile apparatus of FIG. 1.

When the operator depresses a key of the console unit 10 to start the polling call-send reception function, a step S311 is carried out as shown in FIG. 11. In the step S311, whether the SEP signal transmission is ready or not is determined. If the SEP signal transmission is ready, a step S312 is carried out, and if the SEP signal transmission is not ready, a step S316 is carried out. In the step S316, a normal polling reception (polling without SEP signal) is carried out, and after the polling reception, the process is terminated.

In the step S312, whether the polling document sheet number is to be designated or not is determined. If the polling document sheet number is to be designated, a step S313 is carried out, and if the polling document sheet number is not to be designated, the step S316 is carried out. The designation is made by the depression by the operator. It may be preset in the one-touch key.

In the step S313, whether the polling document sheet number has been registered or not is determined. If the polling document sheet number is registered, a step S314 is carried out, and if the polling document sheet number is not registered, a step S317 is carried out. The registration process is same as that of the Embodiment 3.

In the step S317, the polling document sheet number is automatically generated or inputted by the operator based on the telephone number of its own station and the password (which is same as that used in the transmitting station), and the generated or inputted polling document sheet number is stored in the RAM 7.

In the step S314, the polling document sheet number is set in the SEP signal. A step S315 is carried out. In the step S315, the document sheet polling transmitted from the transmitting station is received.

In this manner, by using the SEP signal which contains the polling document sheet number to identify the stored document sheet, the SEP signal for transmitting and receiving the designated document sheet among the plurality of stored document sheets is automatically generated.

By including the subscriber telephone number in the polling document sheet number, the identification number can be uniquely generated.

Further, by including the password in the polling document sheet number, the closed area communication capability is imparted.

In addition, since the polling document sheet number is automatically generated, it is not necessary to designate the polling document sheet number for each of the plurality of waiting document sheets, and the troublesome registration operation of the operator is reduced.

In the Embodiment 4, the facsimile apparatus which is one example of the communication apparatus is described although the present invention is also applicable to an computer-to-computer communication apparatus.

[Embodiment 5]

In the Embodiment 5, a memory box is used. The memory box comprises image management information stores in the image memory 6 and the RAM 7. Attributes, operation commands and registration information are preset in the memory box, and the image inputted to the memory box is processed in accordance with the attribute, operation command and additional information preset in the memory box.

For example, polling transmission using the SEP signal permitted or not permitted as the attribute, an instruction (instructed by a number) to prepare a management report of an image in the memory box as the operation command, and a collation number (SEP number) for the polling transmission, a password (PWD) and a sub-address (SUB) as the additional information.

Communication operations (A) and (B) of the Embodiment 5 which uses the sub-address function, the selective polling function and the password function which are the additional recommended functions of the CCITT T.30 is now explained.

(A) Image Transmission and Reception Operation

Figure 12:
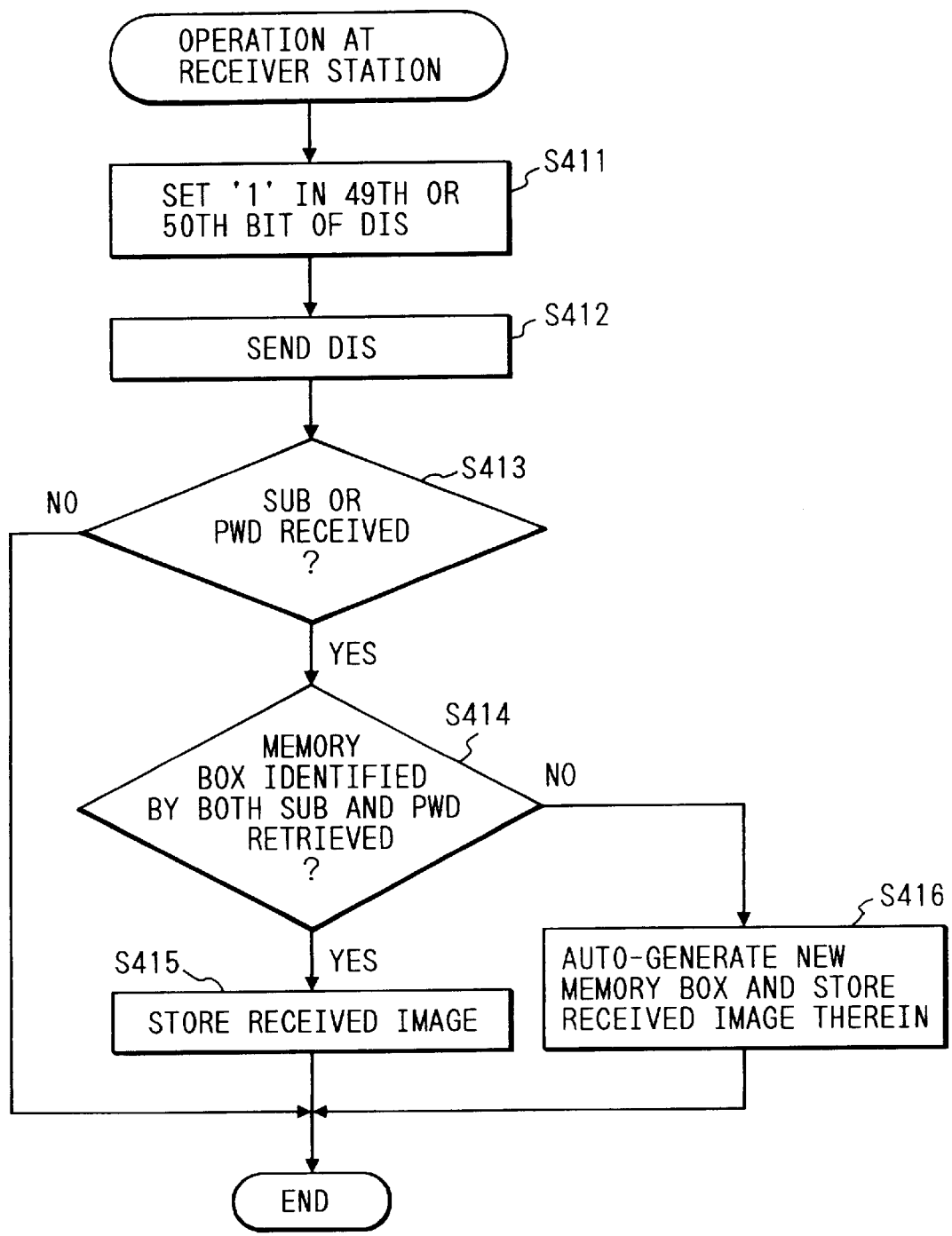
FIG. 12 shows a flow chart of an operation in an image receiving station in an Embodiment 5.

FIG. 12 shows a flow chart of an operation in an image receiving station in the present embodiment.

First, in the execution of the facsimile communication protocol, in order to declare to the calling station the presence of the sub-address function or the password function, the bit 49 or the bit 50 of the DIS signal (initial identification signal) is set to '1' (step S411) and the DIS signal is transmitted to the calling station (step S412). (Both of the bit 49 and the bit 50 may be set to '1'). The DIS signal represents a standard CCITT capability of the receiving station and has a predetermined format of which the bit 49 represents a sub-address capability and the bit 50 represents a password capability.

Then, the DCS signal (digital command signal; a digital set command responsive to the standard function identified by the DIS signal) as well as the sub-address (SUB) signal or the password (PWD) signal transmitted from the calling station are monitored, and whether the sub-address signal or the password signal has been received or not is determined (step S413). If none of the sub-address signal and the password signal is received, the flow is terminated and the process proceeds to a normal procedure following to the DCS reception.

If one or both of the sub-address signal and the password signal is received, whether the memory box which stores the sub-address or the password which matches to the received sub-address signal or the password signal is present or not is determined (step S414). If it is present, the transmitted image is stored in the memory box (step S415), and if it is not present, a memory box which registers the transmitted sub-address and password is automatically prepared and the image is stored in the prepared memory box (step S416).

Figure 13:
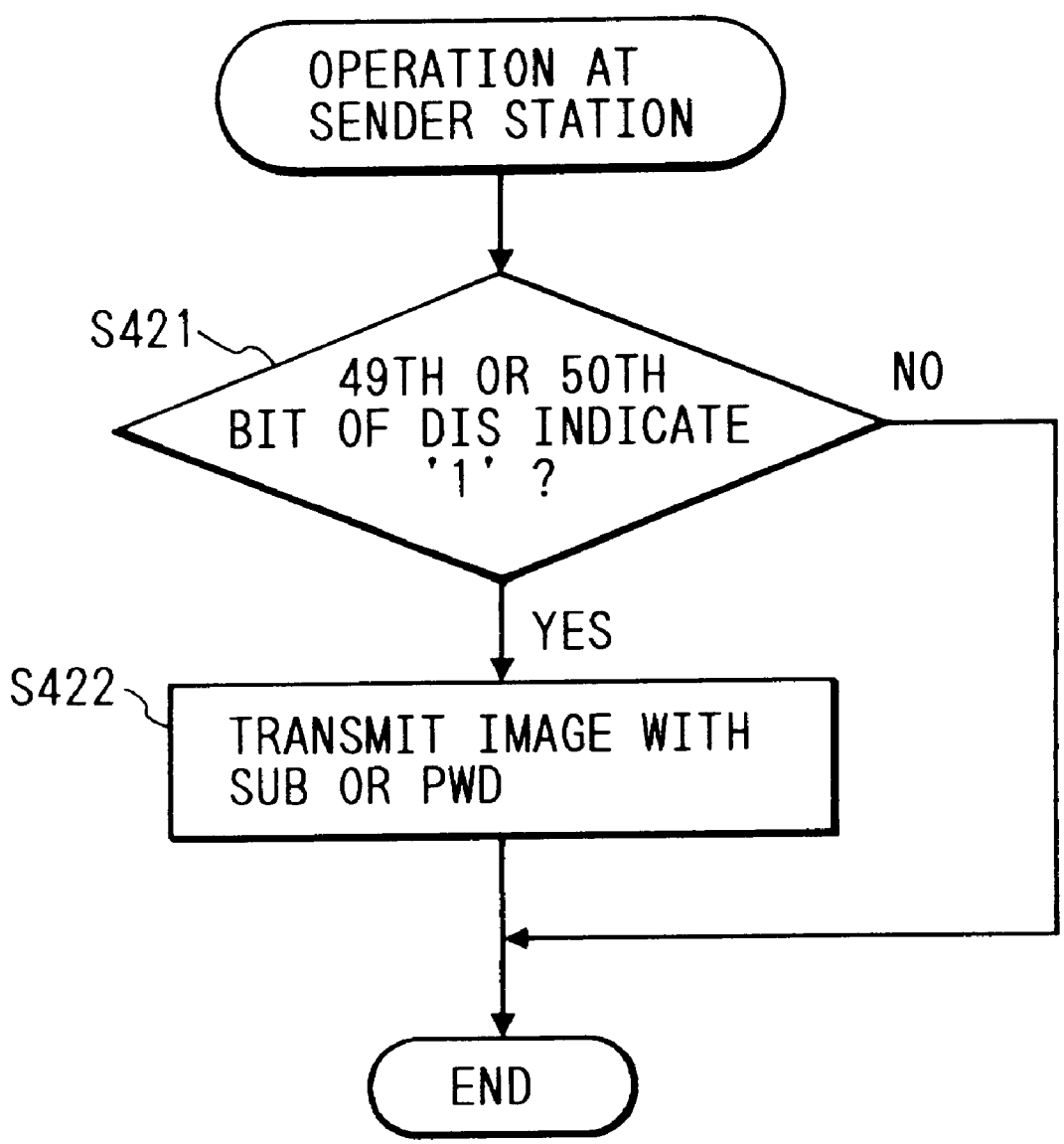
FIG. 13 shows a flow chart of an operation in an image transmission station in the Embodiment 5.

FIG. 13 shows a flow chart of an operation in the image transmitting station in the present embodiment.

The DIS signal is received from the facsimile apparatus in the receiving station and whether the bit 49 or the bit 50 thereof is set to '1' or not is determined (step S421).

If the bit 49 or the bit 50 is set to '1', the image is transmitted to the receiving station together with a predetermined sub-address or password. Namely, as described above, since the bit 49 represents the sub-address capability and the bit 50 represents the password capability, the image is transmitted together with the sub-address or the password. Each of the sub-address and the password comprises 20-digit numerals (20 bytes).

When none of the bit 49 and the bit 50 is set to '1', the DCS signal is transmitted by a normal procedure.

When both of the bit 49 and the bit 50 are set to '1', only the sub-address may be sent together with the image or only the password may be transmitted together with the image.

In the Embodiment 5, by using the sub-address/password, the received image may be stored in the predetermined memory box in the receiving station.

(B) Polling Communication Operation

Figure 14:
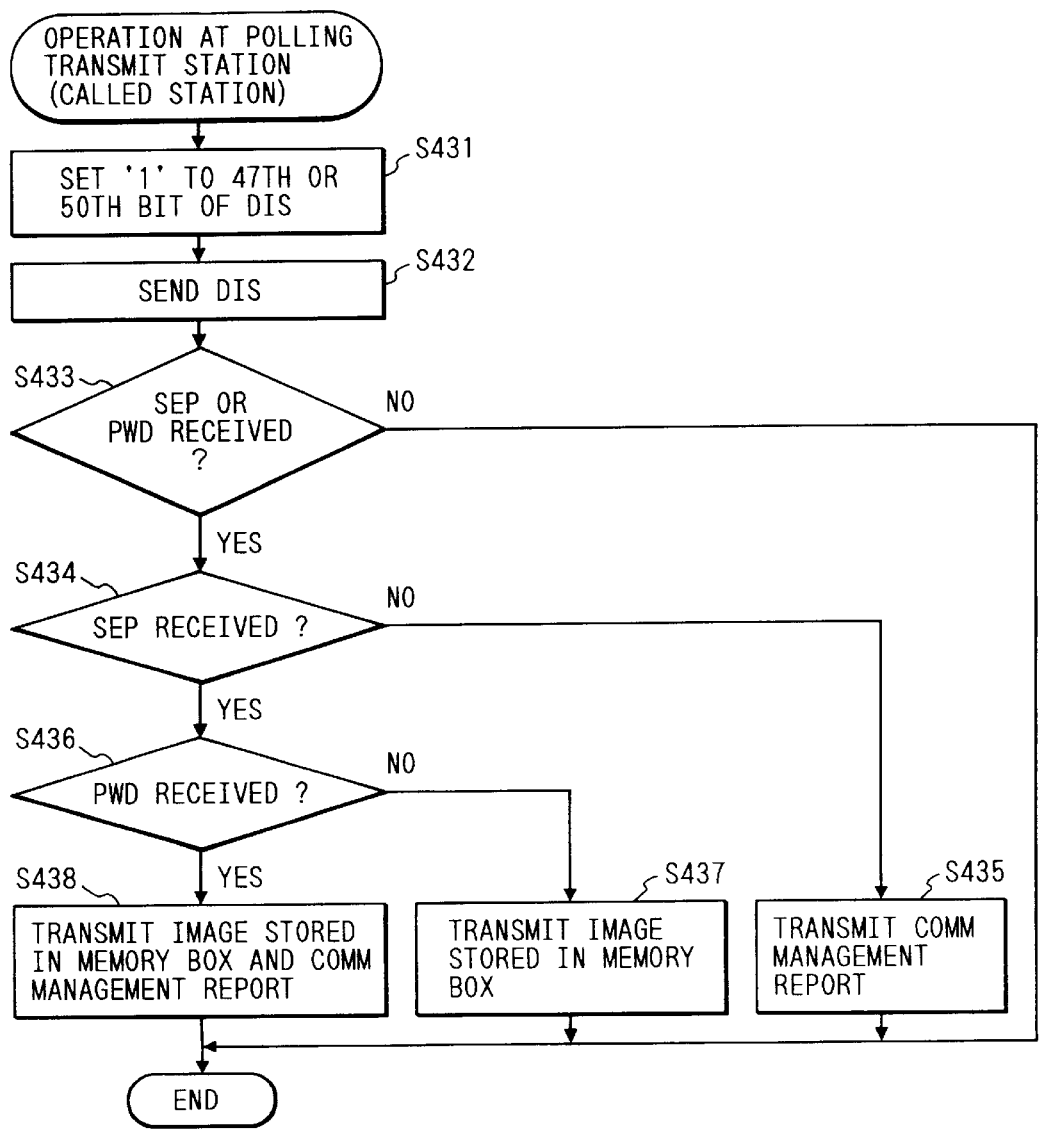
FIG. 14 shows a flow chart of an operation in a polling transmission station (called station) in the Embodiment 5.

FIG. 14 shows a flow chart of an operation of the polling transmission station (called station) in the Embodiment 5.

In order to declare to the calling station the presence of the selective polling function and the password function, the bit 47 and the bit 50 of the DIS signal are set to '1' (step S431) and the DIS signal is transmitted to the calling station (step S432).

Then, the DTC signal is monitored together with the selective polling signal (SEP) or the password signal (PWD) transmitted from the calling station, and whether the selective polling signal or the password signal has been received or not is determined (step S433). When none of the selective polling signal and the password signal is received, the flow is terminated and the process proceeds to a normal procedure following to the reception of the DTC signal.

When the password signal is received (step S434), the communication management report in the memory box corresponding to the received password is polling transmitted (step S435), and when the selective polling signal is received (step S436), the image in the memory box corresponding to the received selective polling is polling transmitted (step S437).

Further, when both of the selective polling and the password are received, the image is polling transmitted from the memory box corresponding to the received selective polling and the communication management report of the memory box corresponding to the password is polling transmitted (step S438).

FIG. 15 shows a flow chart of an operation of the polling receiving station (calling station) in the present embodiment.

The DIS signal is received from the facsimile apparatus in the called station and whether the bit 47 and the bit 50 are set to '1' or not is determined (step S441). If they are not set to '1', the DTC signal is transmitted in the normal procedure and the flow is terminated.

When the bit 47 and the bit 50 are set to '1', the password of the memory box in which the communication management report is stored is transmitted to the called station if the communication management report is to be extracted (steps S442, S443, S444), and if the image is to be extracted, the selective polling of the memory box in which the image is stored is transmitted (steps S445, S446), and then the DTC signal is transmitted.

The selective polling comprises 20-digit numerals (20 bytes) as the sub-address and the password do. Further, when the image and the communication management report are to be extracted, the password and the selective polling of the corresponding memory boxes are transmitted (step S447).

Subsequently, the communication is carried out in the normal procedure and the necessary image is received from the called station.

In the present embodiment, the image can be extracted from the receiving station and the communication management report can be extracted by using the selective polling/password.

The present invention is not limited to the above embodiments but various modifications may be made. For example, the polling communication function in the Embodiment 5 is described as independent before and after the reception of the image, but alternatively, when the received image is stored in the memory box in the reception of the image from one station and that station does not thereafter disconnects the line and the selective polling/password transmitted from that station is detected, the image/communication management report in the memory box corresponding to that selective polling/password may be transmitted.

What is claimed is:

1. A communication apparatus using a selective polling signal, comprising:
   holding means for holding a polling image using an image holding process;
   generation means for automatically generating a selective polling number assigned to the image held in said holding means based on the image holding process;
   memory means for storing the number generated by said generation means;
   receiving means for receiving the selective polling signal; and
   transmission means for comparing a number of the selective polling signal received by said receiving means with the number stored in said memory means and polling transmitting the image held in said holding means when the numbers match.

2. A communication apparatus according to claim 1, wherein said holding means holds a plurality of images and said generation means generates different numbers for different destinations.

3. A communication apparatus according to claim 2, wherein said memory means holds the number generated by said generation means even after completion of polling transmission, and during a next polling waiting period, said generation means does not generate a number and said memory means provides the stored number to said holding means.

4. A communication apparatus according to claim 1, wherein said generation means includes a telephone number of the destination station within the generated number.

5. A communication apparatus according to claim 4, wherein said generation means includes a password within the generated number.

6. A communication apparatus according to claim 1, wherein said communication apparatus is a facsimile apparatus.

7. A facsimile apparatus using a selective polling signal and a password signal, comprising:

receiving means for receiving the selective polling signal;

receiving means for receiving the password signal; and transmission means for transmitting images of different types depending on whether a received signal is the selective polling signal or the password signal, wherein said transmission means transmits, as a sequence of image data, and without disconnecting a communication line, both a document sheet image and a communication management report when both the selective polling signal and the password signal are received, wherein only the document sheet image is sent when the selective polling signal, but not the password signal, is received.

8. A facsimile apparatus according to claim 7, wherein said transmission means transmits a document sheet image when the selective polling signal is received.

9. A facsimile apparatus according to claim 7, wherein said transmission means transmits a communication management report when the password signal is received.

10. A facsimile apparatus using a selective polling signal, comprising:

holding means for holding a polling image;

generation means for generating a selective polling number assigned to the image held in said holding means, said generation means automatically setting an apparatus identification number within the selective polling number;

receiving means for receiving the selective polling signal; and transmission means for comparing a number of the selective polling signal received by said receiving means with the generated number and polling transmitting the image held in said holding means when the numbers match.

11. A facsimile apparatus according to claim 10, wherein the apparatus identification number is a telephone number.

12. A facsimile method using a selective polling signal, comprising the steps of:

holding a polling image;

receiving the selective polling signal, which is a single data packet, the selective polling signal having been established for use as a document identification number in a standard communication recommendation;

extracting a process command for the image held in said holding step from the selective polling signal received by said receiving step, said process command being other than a document identification number; and executing the process command extracted by said extracting step, wherein said process command commands a facsimile apparatus executing said method to transmit a list of data registered in the facsimile apparatus.

13. A facsimile apparatus according to claim 12, wherein the data is one-touch dial data.

14. A facsimile apparatus according to claim 12, wherein data is abbreviated dial data.

15. A communication method using a selective polling signal, comprising the steps of:

holding a polling image using a holding process;

automatically generating a selective polling number assigned to the image held in said holding step based on the holding process;

storing the number generated by said generation step;

receiving the selective polling signal; and comparing a number of the selective polling signal received by said receiving step with the number stored in said storing step and polling transmitting the image held in said holding step when the numbers match.

16. A communication method according to claim 15, wherein said holding step holds a plurality of images and said generating step generates different numbers for different destinations.

17. A communication method according to claim 16, wherein said storing step holds the number generated by said generating step even after completion of polling transmission, and during a next polling waiting period, said generating step does not generate a number and said storing step provides the stored number for said holding step.

18. A communication method according to claim 15, wherein said generating step includes a telephone number of the destination station within the generated number.

19. A communication method according to claim 18, wherein said generating step includes a password within the generated number.

20. A communication method according to claim 15, wherein a communication apparatus using said method is a facsimile apparatus.

21. A facsimile method using a selective polling signal and a password signal, comprising the steps of:

receiving the selective polling signal;

receiving the password signal; and transmitting images of different types depending on whether a received signal is the selective polling signal or the password signal, wherein said transmitting step transmits, as a sequence of image data, and without disconnecting a communication line, both a document sheet image and a communication management report when both the selective polling signal and the password signal are received, wherein only the document sheet image is sent when the selective polling signal, but not the password signal, is received.

22. A facsimile method according to claim 21, wherein said transmitting step transmits a document sheet image when the selective polling signal is received.

23. A facsimile method according to claim 21, wherein said transmitting step transmits a communication management report when the password signal is received.

24. A facsimile method using a selective polling signal, comprising the steps of:

holding a polling image;

generating a selective polling number assigned to the image held in said holding step, said generating step automatically setting an apparatus identification number within the selective polling number;

receiving the selective polling signal; and comparing a number of the selective polling signal received by said receiving step with the generated number and polling transmitting the image held in said holding step when the numbers match.

25. A facsimile method according to claim 24, wherein the apparatus identification number is a telephone number.

26. A facsimile apparatus using a selective polling signal, comprising:

holding means for holding a polled image;

assigning means for automatically setting a specific number according to a destination to a selective polling signal and then setting an optional number to the selective polling signal, for combining the specific number and the optional number to form a combined number, and for assigning the combined number to the image held in said holding means;

receiving means for receiving the selective polling signal; and transmission means for comparing a number of the selective polling signal received by said receiving means with the set number, and for polling transmitting the image held in said holding means when the numbers match.

27. An apparatus according to claim 26, wherein said assigning means combines the predetermined number with another number and assigns the combined number as the set number to the image held in said holding means.

28. An apparatus according to claim 27, further comprising an input means, and wherein the other number is input through the input means.

29. A facsimile method using a selective polling signal, comprising:

holding a polled image;

automatically setting a specific number according to a destination to a selective polling signal, setting an optional number to the selective polling signal for combining the specific number and the optional number to form a combined number;

assigning the combined number to the image held in said holding step;

receiving the selective polling signal; and comparing a number of the selective polling signal received by said receiving step with the set number, and polling transmitting the image held in said holding step when the numbers match.

30. A method according to claim 29, wherein said setting step combines the predetermined number with another number and said assigning step assigns the combined number as the set number to the image held in said holding step.

31. A method according to claim 29, wherein the other number is input through an input means.

* * * * *

UNITED STATES PATENT AND TRADEMARK OFFICE
CERTIFICATE OF CORRECTION

PATENT NO.    : 6,104,504
DATED         : August 15, 2000
INVENTOR(S)   : SATOSHI IMAI ET AL.

It is certified that error appears in the above-identified patent and that said Letters Patent is hereby corrected as shown below:

COLUMN 2

Line 39, "content" should read --contents--.

COLUMN 4

Line 63, "The CPU 1" should read --¶The CPU 1--.

COLUMN 10

Line 39, "of" should be deleted.

COLUMN 11

Line 12, "none of" should read --neither--; and "and" should read --nor--.

UNITED STATES PATENT AND TRADEMARK OFFICE
CERTIFICATE OF CORRECTION

PATENT NO. : 6,104,504

DATED : August 15, 2000

INVENTOR(S) : SATOSHI IMAI ET AL.

Page 2 of 2

It is certified that error appears in the above-identified patent and that said Letters Patent is hereby corrected as shown below:

<u>COLUMN 12</u>

Line 21, "disconnects" should read --disconnect--.

Signed and Sealed this

Twenty-ninth Day of May, 2001

Attest:

NICHOLAS P. GODICI

*Attesting Officer*  Acting Director of the United States Patent and Trademark Office